(12) United States Patent
DeCesaris et al.

(10) Patent No.: US 9,645,598 B2
(45) Date of Patent: May 9, 2017

(54) CONTROLLING DISTRIBUTED POWER STAGES RESPONSIVE TO THE ACTIVITY LEVEL OF FUNCTIONS IN AN INTEGRATED CIRCUIT

(71) Applicant: International Business Machines Corporation, Armonk, NY (US)

(72) Inventors: Michael DeCesaris, Carrboro, NC (US); Luke D. Remis, Raleigh, NC (US); Brian C. Totten, Durham, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 161 days.

(21) Appl. No.: 14/330,687

(22) Filed: Jul. 14, 2014

(65) Prior Publication Data

US 2016/0011621 A1    Jan. 14, 2016

(51) Int. Cl.
    G06F 1/32    (2006.01)
    G06F 3/08    (2006.01)
    G05F 3/08    (2006.01)
    G06F 1/26    (2006.01)

(52) U.S. Cl.
    CPC ............ G05F 3/08 (2013.01); G06F 1/26 (2013.01); G06F 1/32 (2013.01)

(58) Field of Classification Search
    CPC .................................... G06F 1/26; G06F 1/32
    See application file for complete search history.

(56) References Cited

U.S. PATENT DOCUMENTS

| 4,177,508 A | 12/1979 | Schmid |
| 5,181,180 A | 1/1993 | Munro |
| 5,321,600 A | 6/1994 | Fierheller |
| 7,664,974 B2 | 2/2010 | Sone |

(Continued)

OTHER PUBLICATIONS

Hochgraf et al. "StatCom Controls for Operation with Unbalanced Voltages", Electrical and Computer Engineering Department, University of Wisconsin—Madison, Madison, WI 53706, IEEE 1997 (This document only identifies the year of publication (without the month), but the year of publication is sufficiently earlier than the effective U.S. filing date and any foreign priority date so that the particular month of publication is not in issue. See MPEP 609. 04(a)), 8 pages.

(Continued)

*Primary Examiner* — Phil Nguyen
(74) *Attorney, Agent, or Firm* — Jeffrey L. Streets

(57) ABSTRACT

A computer program product includes a computer readable storage medium having program instructions embodied therewith, wherein the program instructions are executable by a processor to cause the processor to perform a method. The method comprises obtaining an activity level for each of a plurality of functions of an integrated circuit, wherein each function has a different physical location on the integrated circuit. The method further includes dynamically adjusting an amount of current supplied to the integrated circuit by each of a plurality of power stages of a DC voltage regulator to meet the current requirements of the plurality of functions and to control power losses between the power stages and the functions, wherein each power stage has a different physical location along a perimeter of the integrated circuit.

20 Claims, 6 Drawing Sheets

(56) References Cited

U.S. PATENT DOCUMENTS

| | | |
|---|---|---|
| 8,097,978 B2 | 1/2012 | Groff et al. |
| 8,179,705 B2 | 5/2012 | Chapuis |
| 8,850,233 B2 * | 9/2014 | Su .................. H02M 3/1584 361/195 |
| 2007/0070673 A1 * | 3/2007 | Borkar .................. G06F 1/3203 365/63 |
| 2008/0082839 A1 * | 4/2008 | Dibene .................. G06F 1/26 713/300 |
| 2010/0219687 A1 * | 9/2010 | Oh .................. G05F 1/46 307/39 |
| 2011/0161683 A1 * | 6/2011 | Zou .................. G06F 1/3203 713/300 |
| 2012/0046794 A1 | 2/2012 | Altimore et al. |
| 2012/0079290 A1 * | 3/2012 | Kumar .................. G06F 1/26 713/300 |
| 2012/0153907 A1 * | 6/2012 | Carobolante ....... H02M 3/1588 323/266 |
| 2013/0047007 A1 * | 2/2013 | Gunther .................. G06F 1/20 713/300 |
| 2013/0057067 A1 | 3/2013 | Creed |
| 2013/0080814 A1 * | 3/2013 | Cong .................. G06F 1/3206 713/340 |
| 2013/0163297 A1 | 6/2013 | Phadke et al. |
| 2014/0001850 A1 | 1/2014 | Guillemin |
| 2014/0189405 A1 * | 7/2014 | Conrad .................. G06F 1/3203 713/323 |
| 2015/0116972 A1 * | 4/2015 | Todorov .................. H01F 17/04 361/782 |

OTHER PUBLICATIONS

Steven Keeping, "The Rise of Digital Control for DC/DC Regulation", DIGI-KEY Corporation—Article Library, http://www.digikey.com/en/articles/techzone/2013/may/the-rise-of-digital-control-for-dcdc-regulation, Contributed by Hearst Electronic Products May 14, 2013, 5 page.

* cited by examiner

CONTROLLING DISTRIBUTED POWER STAGES RESPONSIVE TO THE ACTIVITY LEVEL OF FUNCTIONS IN AN INTEGRATED CIRCUIT

BACKGROUND

Field of the Invention

The present invention relates to systems and methods for providing direct current to an integrated circuit.

Background of the Related Art

Integrated circuits are often installed on a printed circuit board that provides mechanical support, electrical power, and communication channels to other components on the printed circuit board. The printed circuit board may be formed with multiple laminated layers including an electrically conductive power plane and an electrically conductive ground plane. The power and ground planes provide a means for electrical power distribution across the printed circuit board. Various components, such as an integrated circuit, may be coupled to the power and ground planes in order to receive electrical power. A component may be coupled to the power and ground planes by plated through holes referred to as vias.

While a computer may be plugged into an alternating current (AC) electrical outlet or cable, a power supply converts the alternating current to direct current for use by the integrated circuits and other components within the computer. Direct current (DC) is provided to the power plane for distribution to the various components. Furthermore, various components installed on the printed circuit board may require different DC voltages, such that it is necessary to provide DC-DC voltage regulators that step down the DC voltage to the appropriate level.

BRIEF SUMMARY

One embodiment of the present invention provides a computer program product comprising a computer readable storage medium having program instructions embodied therewith, the program instructions executable by a processor to cause the processor to perform a method. The method comprises obtaining an activity level for each of a plurality of functions of an integrated circuit, wherein each function has a different physical location on the integrated circuit. The method further comprises dynamically adjusting an amount of current supplied to the integrated circuit by each of a plurality of power stages of a DC voltage regulator to meet the current requirements of the plurality of functions and to control power losses between the power stages and the functions, wherein each power stage has a different physical location along a perimeter of the integrated circuit.

DETAILED DESCRIPTION

Figure 1:
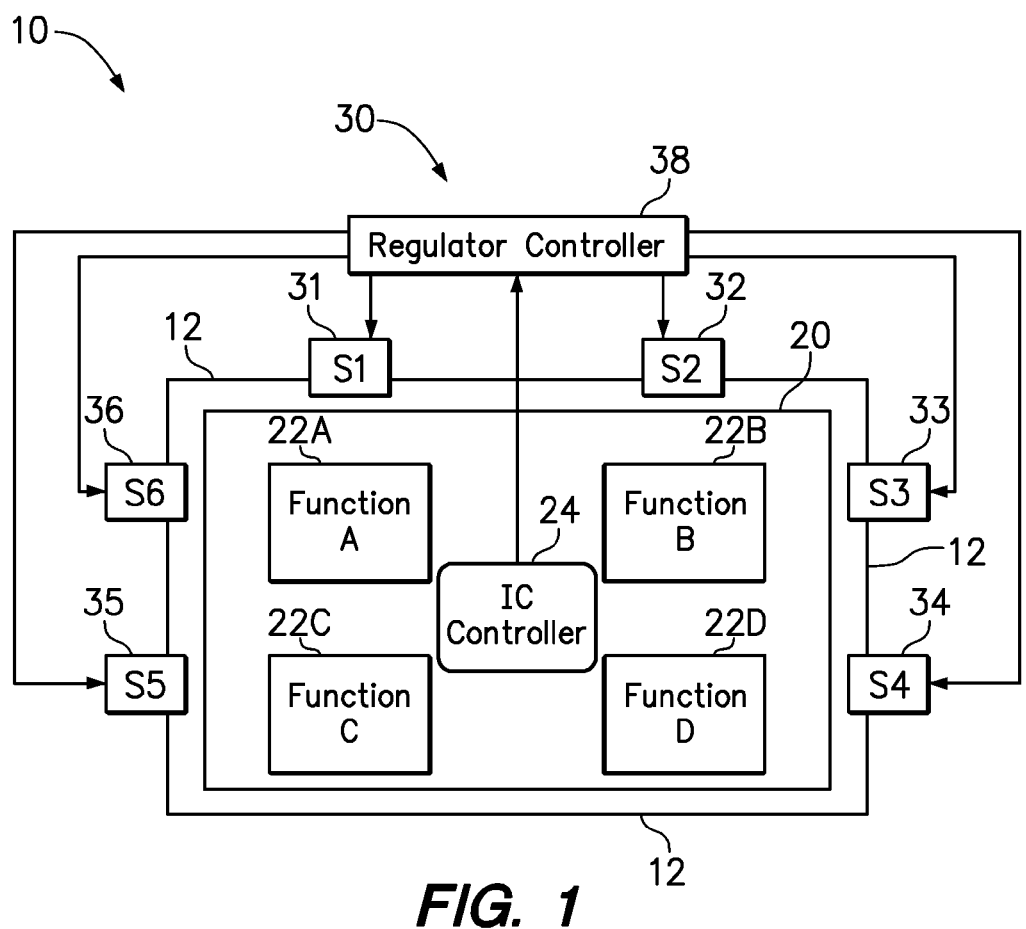
FIG. 1 is a schematic plan view of a system including a DC voltage regulator having power stages located around a perimeter of an integrated circuit.

One embodiment of the present invention provides a method, comprising obtaining an activity level for each of a plurality of functions of an integrated circuit, wherein each function has a different physical location on the integrated circuit. The method further comprises dynamically adjusting an amount of current supplied to the integrated circuit by each of a plurality of power stages of a DC voltage regulator to meet the current requirements of the plurality of functions and to control power losses between the power stages and the functions, wherein each power stage has a different physical location along a perimeter of the integrated circuit.

The plurality of functions of the integrated circuit may include various sub-circuits or sections that facilitate different operations. The functions may include, for example, processor cores, unique circuit blocks, different logic domains, or memories. In one embodiment, the integrated circuit include multiple processor cores, such as four processor cores physically located in separate quadrants of the integrated circuit.

Embodiments of the present invention control power losses between each power stage and each function by adjusting an amount of current supplied by each of the power stages. Preferably, the amount of current supplied by each power stage is dynamically adjusted to reduce power losses between the power stages and the functions relative to an amount of power losses that would occur if each power stage provided an equal amount of current. Still further, the amount of current supplied by each power stage may be weighted according to the activity level of a function closest to each power stage. Most preferably, the amount of current supplied by each power stage may be dynamically adjusted to minimize power losses between the power stages and the functions. The amount of current to be supplied by each power stage may be determined using a power loss equation or by accessing a fixed lookup table that identifies an amount of current for each power stage that is appropriate for a particular activity level of each function.

An optional logic for minimizing the power losses may be performed with knowledge of the resistance of each conduction path between a power stage and a function, knowledge of the range of possible current consumption from each and every function, and knowledge of the range of possible current delivery from each and every power stage (Ex. 0 A to maximum load or power stage acceptable current limit). Then the logic can calculate the total power loss of the system considering each possible combination of power stage and function, and, for a given load operating point, select the power stage current weighting which yields the lowest total calculated power loss value for that load operating point.

The different physical locations of the power stages along the perimeter of the integrated circuit provide a variety of path lengths to each of the functions. Providing more current through a shorter path length between a power stage and a function can reduce the overall power losses associated with supplying power to the function. In one embodiment, the integrated circuit may be rectangular and the plurality of power stages may be located on at least two opposing sides of the integrated circuit. For example, the plurality of functions may include at least four functions and the plurality of power stages may include at least four power stages. Preferably, at least one of the power stages will be directly adjacent each one of the functions, since this provides a very short conductive path length. In another example, the plurality of power stages may include six power stages distributed around the perimeter of the integrated circuit, with two power stages located on each of three sides of the integrated circuit.

However, the distance between a power stage and a function is not necessarily the sole determiner of resistance. For example, a first conduction path between a first power stage and a first function could be short but narrow, while a second conduction path between a second power stage and a second function could be long but wide and thus no more resistive than the short path. Also, the total resistance between each power stage and each function may, for example, be influenced by solder joints, copper thickness, via count, IC power distribution characteristics and other characteristics.

While the activity level of each function may be obtained periodically or upon occurrence of some event, the activity level of each function is preferably updated continuously during operation of the integrated circuit. In a preferred system, an internal controller of the integrated circuit communicates the activity level of each function to a regulator controller over a control line or bus. Accordingly, the regulator controller may control each of the power stages, such as by dynamically controlling the amount of current provided by each power stage in response to the updated activity level for each function.

Power losses between each power stage and each function may be calculated as the sum of the power loss between each power stage and each function, where the power loss is a function of the square of the amount of current multiplied by the electrical resistance in a conduction path from the power stage to the function. Furthermore, the electrical resistance in the conduction path may be determined as a function of electrical resistivity of the particular conduction path and a path length of the particular conduction path. The electrical resistivity of the conduction path is a property of the conductive material and geometry, which is typically a thin plane of copper. Accordingly, the system may store a known path length or electrical resistance for each possible pairing of one of the functions and one of the power stages. Then, the system may determine an amount of current to be supplied by one or more of the power stages in order to reduce, minimize or otherwise control the power losses associated with supplying the power requirements of the integrated circuit.

For the limited purpose of providing a specific example, the plurality of functions of an integrated circuit may include a first function having an activity level that is greater than an activity level of the other functions. Furthermore, the plurality of power stages may include a first power stage that is closest to the first function. An amount of current provided to the integrated circuit by each of a plurality of power stages of a DC voltage regulator may be dynamically adjusted in a manner that causes the first power stage to supply a greater than equal portion of the amount of current provided to the integrated circuit.

Various embodiments of the invention may measure or identify an activity level of a function of the integrated circuit in different ways and using different quantitative or qualitative measures. For example, the activity level may be measured by an instruction counter, or identified by a task size or a processor sleep state. Still further, a future activity level of a function may be determined by analyzing a queue of pending workload.

In one option, each power stage supplies electrical current to a power plane and each function is electrically connected between the power plane and a ground plane. Accordingly, the power losses between the power stages and the functions occur in the power plane and the ground plane. The power losses in the power and ground planes may be calculated as the sum of the power losses between each power stage and each function, wherein each power loss is a function of the square of the amount of current multiplied by the electrical resistance in a current loop from the power stage to the function through the power plane and from the function to the power stage through the ground plane.

Another embodiment of the present invention provides a computer program product comprising a computer readable storage medium having program instructions embodied therewith, the program instructions executable by a processor to cause the processor to perform a method. The method comprises obtaining an activity level for each of a plurality of functions of an integrated circuit, wherein each function has a different physical location on the integrated circuit. The method further comprises dynamically adjusting an amount of current supplied to the integrated circuit by each of a plurality of power stages of a DC voltage regulator to meet the current requirements of the plurality of functions and to control power losses between each power stage and each function, wherein each power stage has a different physical location along a perimeter of the integrated circuit.

The foregoing computer program products may further include computer readable program code for implementing or initiating any one or more aspects of the methods described herein. Accordingly, a separate description of the methods will not be duplicated in the context of a computer program product.

FIG. 1 is a schematic plan view of a system 10 including an integrated circuit 20 and a DC voltage regulator 30. The integrated circuit 20 includes four functions 22A-D (Function A, Function B, Function C, and Function D), such as processor cores, located in separate quadrants of the integrated circuit, and an internal controller 24 (IC Controller). The integrated circuit 20 is installed on a printed circuit board (not shown) that includes a power plane 12. For any given integrated circuit, the location of each function on the integrated circuit is fixed and those locations are published by the integrated circuit manufacturer. Accordingly, the regulator controller 38 may identify the physical location of each function.

The DC voltage regulator 30 includes a regulator controller 38 and six power converter stages 31-36, such as synchronous buck power stages, located around a perimeter of the integrated circuit 20. In the implementation shown, the integrated circuit 20 is rectangular and there are two regulators located along each of three sides of the rectangular integrated circuit. Each of the six power stages 31-36 supplies electrical current to the power plane 12 from a power supply (not shown). The amount of electrical current supplied by any one or more of the power stages 31-36 is controlled by the regulator controller 38, which sends a control signal to each power stage 31-36.

For any given integrated circuit 20, the location of each function 22A-D on the integrated circuit is fixed and those locations are available from the integrated circuit manufacturer. Accordingly, the regulator controller 38 may identify the physical location of each function. Similarly, for any printed circuit board, such as a computer motherboard, the location of each power stage is fixed and those locations are available from the printed circuit board manufacturer. The regulator controller 38 may therefore identify the physical location of each power stage. Accordingly, the regulator controller 38 may determine the distance between each power stage and each function. Furthermore, it is preferable to locate the power stages as close as possible to each function so that the conduction path length between a function as an adjacent power stage is minimized.

Where the regulator controller 38 identifies the distance between each power stage and each function, the regulator controller should also have access to the resistivity of the conduction path so that the overall resistance can be calculated. Alternatively, the regulator controller 38 may directly identify the resistance between each power stage and each function. For example, a designer may pre-program the regulator controller with set values that represent the resistance (or the distance and resistivity) between each power stage and each of the various circuit functions. However, since the resistance changes with distance between a power stage and a function, much of the discussion herein is framed in terms of distance.

The IC controller 24 communicates with the regulator controller 38 over a control line or bus to identify an activity level of one or more active functions 22A-D on the integrated circuit 20. The activity level may be in units of electrical current or may be converted from other units, such as processor instructions, to an amount of electrical current. Accordingly, the regulator controller 38 has information identifying the distances between each power stage and each function, as well as the amount of current that needs to be supplied to each function 22A-D. The regulator controller 38 may use this information to determine an amount of current that should be supplied by each of the regulator phases in order to reduce or minimize the power losses associated with providing the current requirements of each function. As a practical matter, the regulator controller will control the power stages so that a greater than equal amount of current is provided by a power stage that is closest to the function with the highest activity level. In other words, the regulator controller may intentionally imbalance the amount of current provided by each regulator stage. As the activity level or load shifts among the functions (i.e., shifts among locations), the power stages may be dynamically controlled in real time so that power losses are continually reduced or minimized.

The regulator controller may control the power stages to reduce or minimize power losses regardless of whether all of the functions are active or only a subset of the functions are active (i.e., one or more of the functions are OFF (i.e., consuming no power)). For the cases where only one function is active, the IC controller may communicate with the regulator controller to identify which function (i.e., which location, such as a quadrant) is active. With this information, the regulator may reduce current through, or perhaps shut off, those power stages that are physically most distant from the active function and leave on the one or more phases that are physically closer to the active function. For example, if only one function is active and that one function is consuming 6 A, a traditional DC voltage regulator would cause each power stage to supply an equal amount of current to that function (or 1 A per power stage). However, in accordance with methods of the present invention, the regulator controller causes the power stage closest to the load activity to supply a greater portion (or all) of the current to the active function. Power stages that are physically further from the active function will provide a lesser portion, if any, of the current to the active function.

Figure 2:
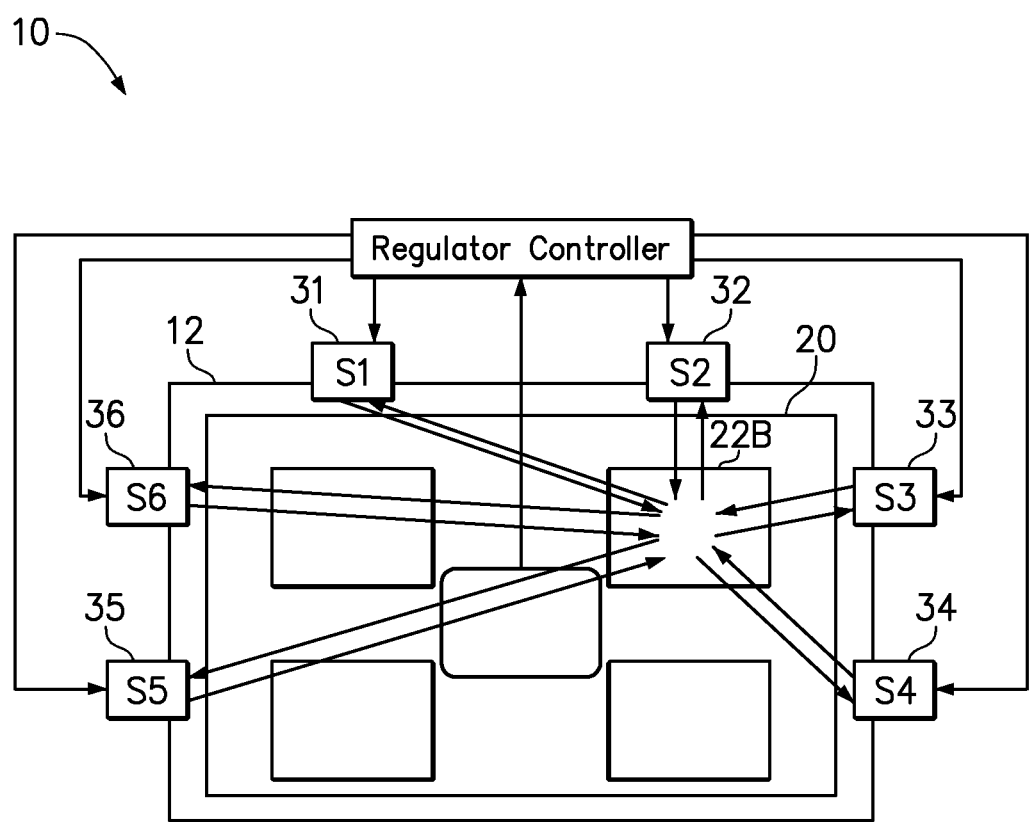
FIG. 2 is a diagram of the system illustrating current conductions paths from each of the power stages to an active function of the integrated circuit.

FIG. 2 is a diagram of the system 10 illustrating current conductions paths (see arrows) from each of the power stages 31-36 to an active function 22B (Function B) of the integrated circuit 20. The total current conduction path length for each power stage is a current loop from a particular power stage 31-36 to the active function 22B in the power plane 12 and back to the particular power stage 31-36 in the ground (GND) plane copper. In various embodiments of the present invention, the amount of current supplied to the active function is weighted to one or more power stages nearest to the active function so that more of the current has a shorter conduction path length than power stages that are further from the active function. In this example, a larger amount of current may be supplied by the closest power stages 32, 33 (S2 and S3), a smaller amount of current may be supplied by the next closest power stages 31, 34 (S1 and S4), and an even smaller amount, if any, current may be supplied by the furthest power stages 35, 36 (S5 and S6).

Figure 3:
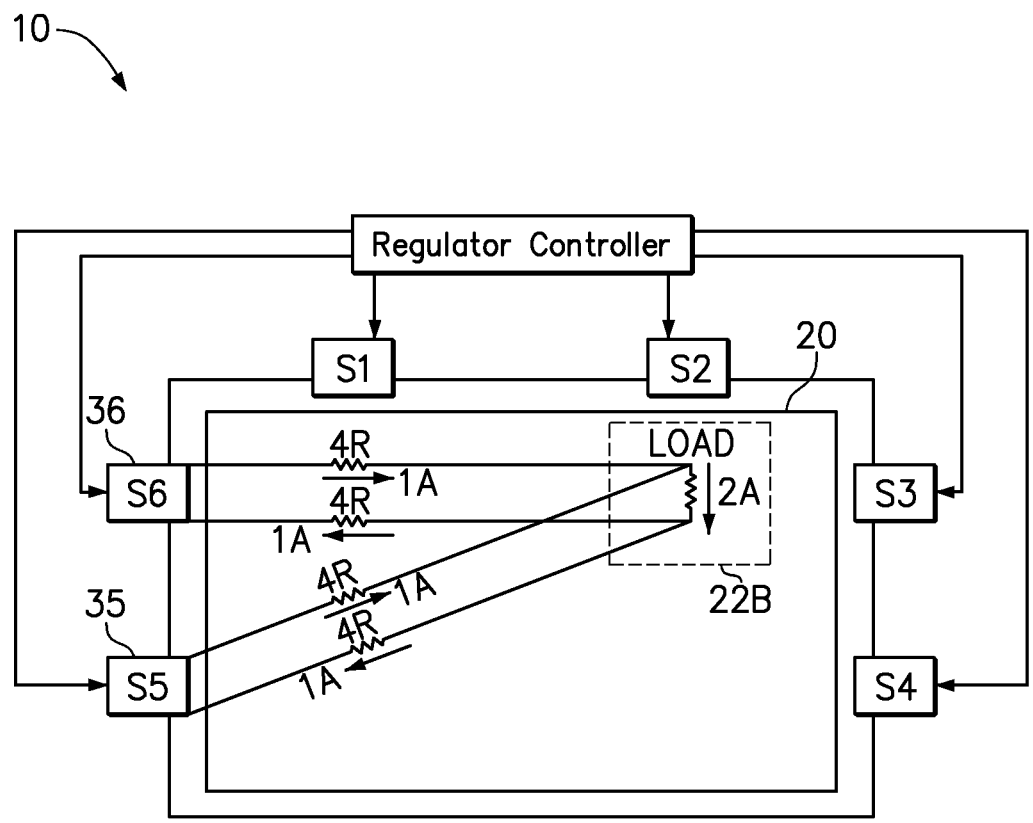
FIG. 3 is a diagram of the system illustrating power losses when providing power to the active function from two power stages that are on the opposite side of the integrated circuit from the active function.

FIG. 3 is a diagram of the system 10 illustrating power losses when providing power to a single active function 22B from two power stages 35, 36 (S5 and S6) that are on the furthest side of the integrated circuit 20 from the active function 22B. Various details from FIGS. 1 and 2 have been omitted from FIGS. 3-5 for the purpose of focusing on this specific examples.

As shown in FIG. 3, only the one function 22B in the upper right quadrant of the integrated circuit 20 is active, and that one function 22B is requiring 2A of electrical current. When the 2 A of current is supplied equally by the two power stages 35, 36 (S5 and S6), each power stage supplies 1 A of current that must follow a long current path length through copper power and ground planes such that the electrical resistance is 4R in the power plane and 4R in the ground plane. Since the total power loss is equal to the sum of the individual power losses, the total power loss is $\Sigma I^2 R$, where I is the current and R is the electrical resistance. Accordingly, the total power loss (ignoring units) is $\Sigma I^2 R = (1)^2(4) + (1)^2(4) + (1)^2(4) + (1)^2(4) = 4+4+4+4=16$.

Figure 4:
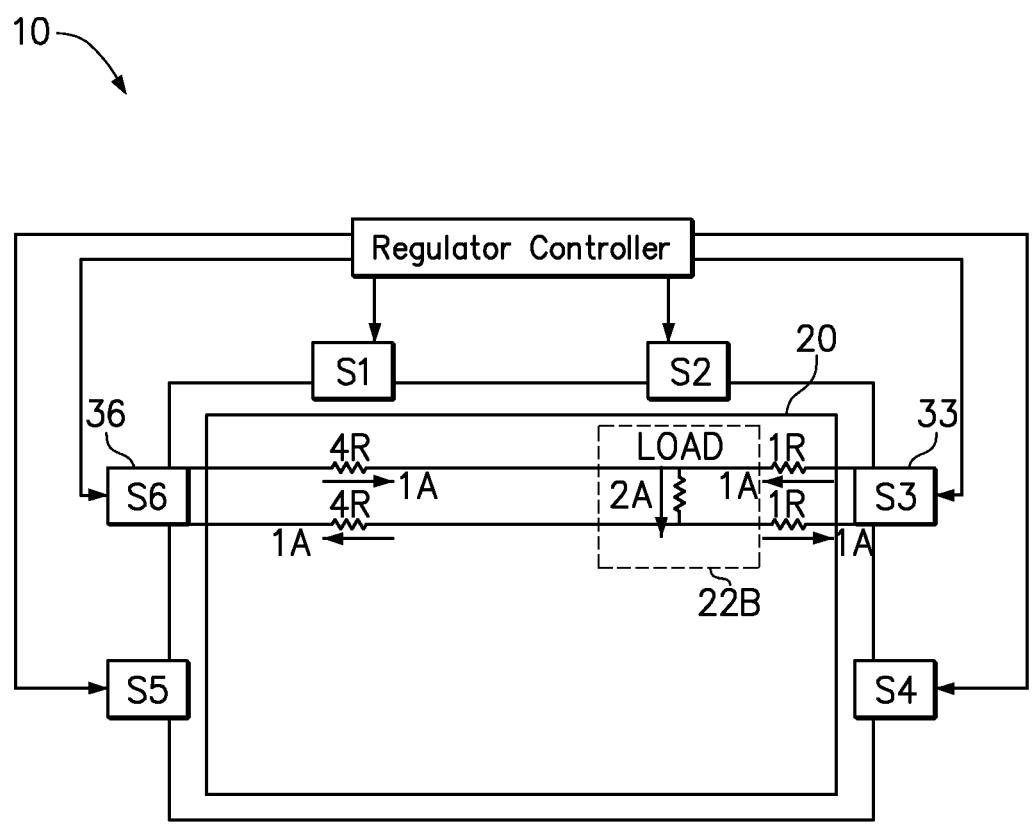
FIG. 4 is a diagram of the system illustrating power losses when providing power to the active function from two power stages on opposing sides of the integrated circuit function.

FIG. 4 is a diagram of the system 10 illustrating power losses when providing the same requirement of 2 A current to the same active function 22B from two power stages 33, 36 (S3 and S6) on opposing sides of the integrated circuit function. Since one power stage 33 (S3) is physically located closer to the active function 22B, the current path to and from the active function is much shorter than the current path between the other power stage 36 (S6) and the active function. As a result, the electrical resistance associated with the current path in the power plane and in the ground plane when using the power stage 33 (S3) is only 1R, as compared to an electrical resistance of 4R in the current path associated with the other power stage 36 (S6). As shown in FIG. 4, the two power stages 33, 36 (S3 and S6) are both providing 1 A of current to the active function. Accordingly, the total power loss (ignoring units) is $\Sigma I^2 R = (1)^2(4) + (1)^2(4) + (1)^2(1) + (1)^2(1) = 4+4+1+1=10$.

Figure 5:
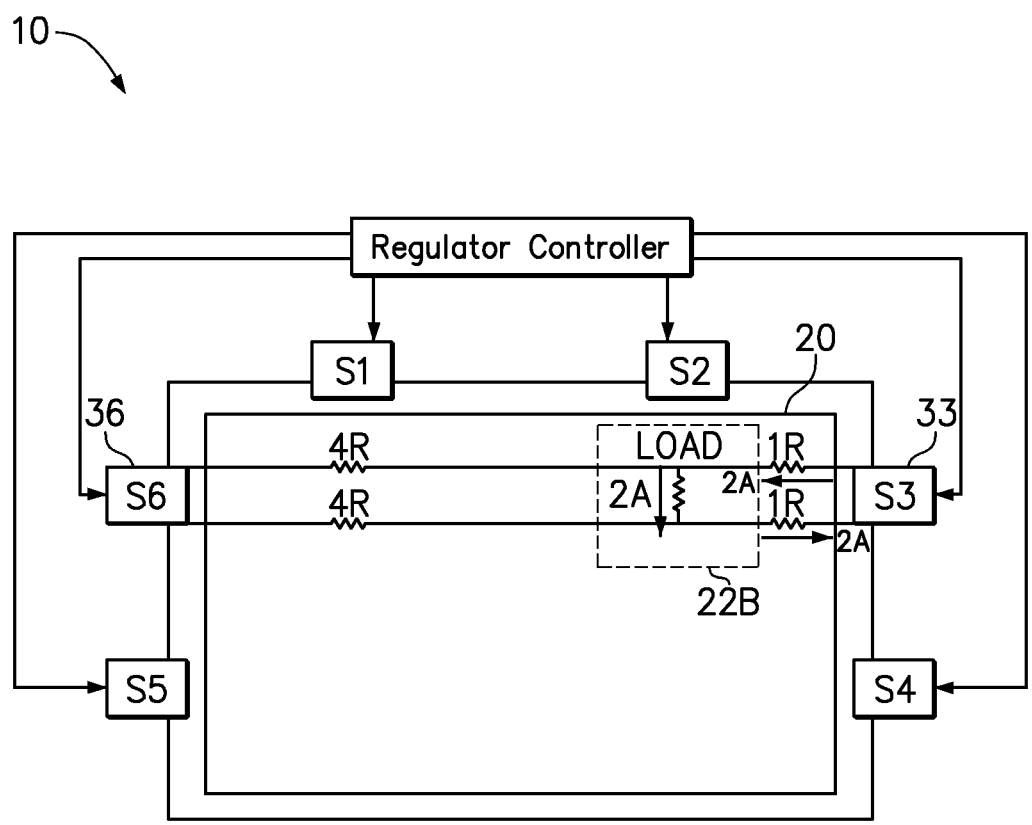
FIG. 5 is a diagram of the system illustrating power losses when providing power to the active function from the power stage that is the nearest to active function.

FIG. 5 is a diagram of the system 10 illustrating power losses when providing power to the active function from the power stage that is the nearest to active function. As shown, the closest power stage 33 (S3) is providing the entire 2A of current required by the active function 22B. Accordingly, the total power loss (ignoring units) is $\Sigma I^2 R = (0)^2(0) + (0)^2(0) + (2)^2(1) + (2)^2(1) = 0+0+4+4=8$. While the power loss associated with supplying all of the current from the closest power stage is less than the power losses shown in reference to either FIG. 3 or FIG. 4, further optimization is certainly possible in accordance with the methods of the present invention. For example, providing current from the closest two power stages 32, 33 (S2 and S3) would likely provide even lower power losses than shown in reference to FIG. 5. In another example, it is likely that supplying some small fraction of the current from other power stages would also provide even lower power losses. It should be recognized that any number of power stages may supply current at the same time, and that any power stage could be controlled to provide any weighted percentage of the total current requirement of the active function(s).

Figure 6:
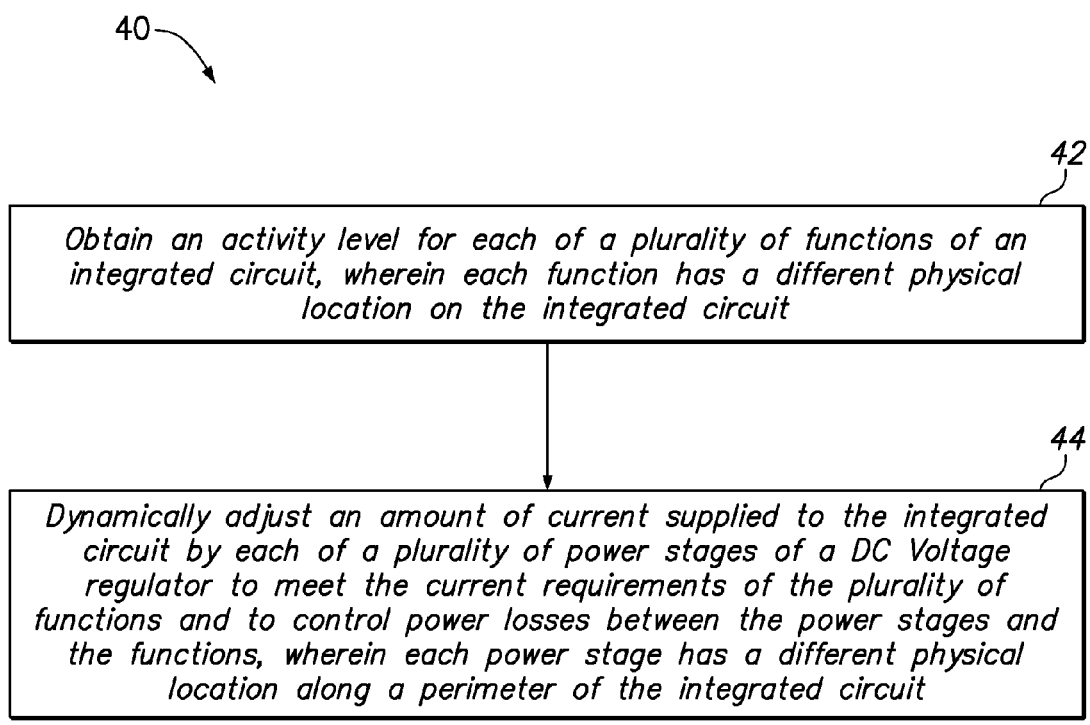
FIG. 6 is a flowchart of a method according to one embodiment of the present invention.

FIG. 6 is a flowchart of a method 40 according to one embodiment of the present invention. In step 42, the method obtains an activity level for each of a plurality of functions of an integrated circuit, wherein each function has a different physical location on the integrated circuit. In step 44, the method dynamically adjusts an amount of current supplied to the integrated circuit by each of a plurality of power stages of a DC voltage regulator to meet the current requirements of the plurality of functions and to control power losses between the power stages and the functions, wherein each power stage has a different physical location along a perimeter of the integrated circuit.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a non-transitory computer readable storage medium having program instructions embodied therewith, the program instructions executable by a processor to cause the processor to perform a method comprising:
    obtaining an activity level for each of a plurality of functions of an integrated circuit, wherein each function has a different physical location on the integrated circuit;
    dynamically adjusting an amount of current supplied to the integrated circuit by each of a plurality of power stages of a DC voltage regulator to meet the current requirements of the plurality of functions and to control power losses between the power stages and the functions, wherein each power stage supplies electrical current to a power plane and each function is electrically connected between the power plane and a ground plane, wherein each power stage has a different physical location along a perimeter of the integrated circuit, and wherein the power losses between the power stages and the functions occur in the power plane and the ground plane; and
    calculating the power losses between the power stages and the functions as the sum of the power loss between each power stage and each function, wherein the power loss is a function of the square of the amount of current multiplied by the electrical resistance in a conduction path from the power stage to the function.

2. The computer program product of claim 1, wherein the amount of current supplied by each power stage is dynamically adjusted to reduce power losses between the power stages and the functions relative to an amount of power losses that would occur if each power stage provided an equal amount of current.

3. The computer program product of claim 1, wherein the amount of current supplied by each power stage is dynamically adjusted to minimize power losses between the power stages and the functions.

4. The computer program product of claim 1, wherein the amount of current supplied by each power stage is weighted according to the activity level of a function closest to each power stage.

5. The computer program product of claim 1, wherein the plurality of functions includes at least four functions and the plurality of power stages includes at least four power stages.

6. The computer program product of claim 1, wherein the activity level of each function is updated continuously during operation of the integrated circuit.

7. The computer program product of claim 6, wherein the amount of current provided by each power stage is dynamically controlled in response to the updated activity level for each function.

8. The computer program product of claim 1, wherein the plurality of functions are processor cores.

9. The computer program product of claim 1, the method further comprising:
    calculating the electrical resistance in the conduction path as a function of electrical resistivity of the conduction path and a path length of the conduction path.

10. The computer program product of claim 9, the method further comprising:
    storing a known path length or electrical resistance for each possible pairing of one of the functions and one of the power stages.

11. A computer program product comprising a non-transitory computer readable storage medium having program instructions embodied therewith, the program instructions executable by a processor to cause the processor to perform a method comprising:
    obtaining an activity level for each of a plurality of functions of an integrated circuit, wherein each function has a different physical location on the integrated circuit; and
    dynamically adjusting an amount of current supplied to the integrated circuit by each of a plurality of power stages of a DC voltage regulator to meet the current requirements of the plurality of functions and to control power losses between the power stages and the functions, wherein each power stage supplies electrical current to a power plane and each function is electrically connected between the power plane and a ground plane, wherein each power stage has a different physical location along a perimeter of the integrated circuit, and wherein the power losses between the power stages and the functions occur in the power plane and the ground plane; and wherein the plurality of functions includes a first function having an activity level that is greater than an activity level of the other functions, wherein the plurality of power stages includes a first power stage that is closest to the first function, and wherein the step of dynamically adjusting an amount of current provided to the integrated circuit by each of a plurality of power stages of a DC voltage regulator includes causing the first power stage to supply a greater than equal portion of the amount of current provided to the integrated circuit.

12. The computer program product of claim 1, the method further comprising:

measuring the activity level of each function of the integrated circuit by way of a counter, a task size, or a processor sleep state.

13. The computer program product of claim 1, the method further comprising:

determining a future activity level of a function by analyzing a queue of pending workload.

14. The computer program product of claim 1, the method further comprising:

accessing a fixed lookup table that identifies an amount of current for each power stage for a particular activity level of each function.

15. A computer program product comprising a non-transitory computer readable storage medium having program instructions embodied therewith, the program instructions executable by a processor to cause the processor to perform a method comprising:

obtaining an activity level for each of a plurality of functions of an integrated circuit, wherein each function has a different physical location on the integrated circuit;

dynamically adjusting an amount of current supplied to the integrated circuit by each of a plurality of power stages of a DC voltage regulator to meet the current requirements of the plurality of functions and to control power losses between the power stages and the functions, wherein each power stage supplies electrical current to a power plane and each function is electrically connected between the power plane and a ground plane, wherein each power stage has a different physical location along a perimeter of the integrated circuit, and wherein the power losses between the power stages and the functions occur in the power plane and the ground plane; and calculating the power losses in the power and ground planes as the sum of the power loss between each power stage and each function, wherein the power loss is a function of the square of the amount of current multiplied by the electrical resistance in a current loop from the power stage to the function through the power plane and from the function to the power stage through the ground plane.

16. The computer program product of claim 15, the method further comprising:

calculating the electrical resistance in the current loop as a function of electrical resistivity of the power and ground planes and a path length of the current loop.

17. A method, comprising:

obtaining an activity level for each of a plurality of functions of an integrated circuit, wherein each function has a different physical location on the integrated circuit;

dynamically adjusting an amount of current supplied to the integrated circuit by each of a plurality of power stages of a DC voltage regulator to meet the current requirements of the plurality of functions and to control power losses between the power stages and the functions, wherein each power stage supplies electrical current to a power plane and each function is electrically connected between the power plane and a ground plane, wherein each power stage has a different physical location along a perimeter of the integrated circuit, and wherein the power losses between the power stages and the functions occur in the power plane and the ground plane; and calculating the power losses between the power stages and the functions as the sum of the power loss between each power stage and each function, wherein the power loss is a function of the square of the amount of current multiplied by the electrical resistance in a conduction path from the power stage to the function.

18. The method of claim 17, wherein the amount of current supplied by each power stage is dynamically adjusted to reduce power losses between the power stages and the functions relative to an amount of power losses that would occur if each power stage provided an equal amount of current.

19. The method of claim 17, wherein the amount of current supplied by each power stage is dynamically adjusted to minimize power losses between the power stages and the functions.

20. An apparatus, comprising:

at least one storage device for storing program instructions; and at least one processor for processing the program instructions to:

obtain an activity level for each of a plurality of functions of an integrated circuit, wherein each function has a different physical location on the integrated circuit; and dynamically adjust an amount of current supplied to the integrated circuit by each of a plurality of power stages of a DC voltage regulator to meet the current requirements of the plurality of functions and to control power losses between the power stages and the functions, wherein each power stage supplies electrical current to a power plane and each function is electrically connected between the power plane and a ground plane, wherein each power stage has a different physical location along a perimeter of the integrated circuit, and wherein the power losses between the power stages and the functions occur in the power plane and the ground plane; and wherein the plurality of functions includes a first function having an activity level that is greater than an activity level of the other functions, wherein the plurality of power stages includes a first power stage that is closest to the first function, and wherein dynamically adjusting an amount of current provided to the integrated circuit by each of a plurality of power stages of a DC voltage regulator includes causing the first power stage to supply a greater than equal portion of the amount of current provided to the integrated circuit.

* * * * *